Aug. 26, 1969        G. L. CORBETT        3,463,079
BALING MACHINES

Filed June 1, 1967        4 Sheets-Sheet 1

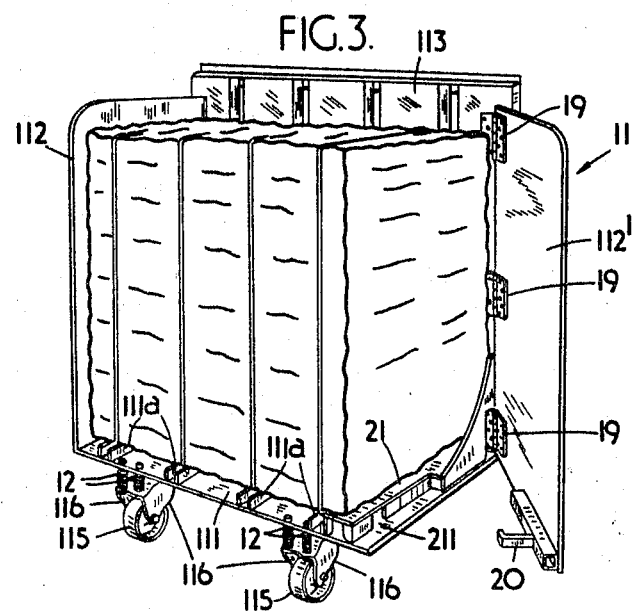
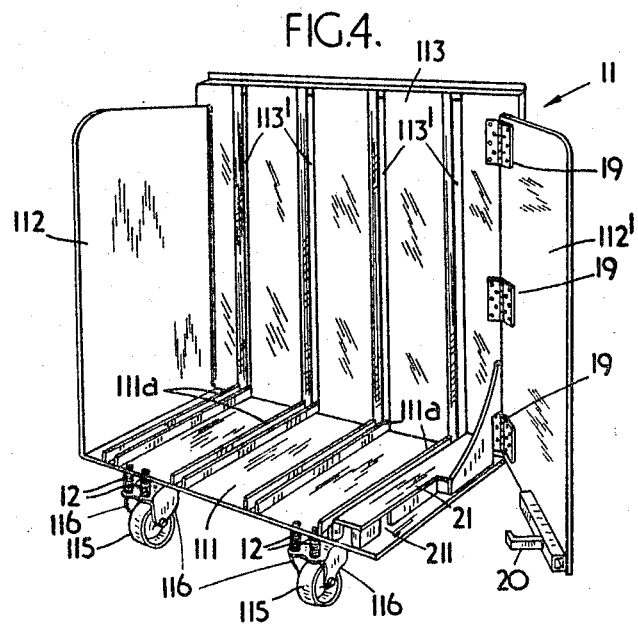

Aug. 26, 1969 G. L. CORBETT 3,463,079
BALING MACHINES

Filed June 1, 1967 4 Sheets-Sheet 4

United States Patent Office 3,463,079
Patented Aug. 26, 1969

3,463,079
BALING MACHINES
George Lawrence Corbett, Birmingham, England, assignor to Portable Balers Limited, Hockley, Birmingham, England, a corporation of the United Kingdom of Great Britain and Northern Ireland
Filed June 1, 1967, Ser. No. 642,750
Claims priority, application Great Britain, June 23, 1966, 28,112/66; Feb. 28, 1967, 9,413/67, 9,414/67, 9,415/67, 9,417/67
Int. Cl. B30b 1/24, 15/30; B65b 13/04
U.S. Cl. 100—215                9 Claims

ABSTRACT OF THE DISCLOSURE

This invention has reference to baling machines and consists inter alia of a baling machine operating on the general principles of the prior United States Patent No. 2,757,603 in which the bottom of the detachable mobile truck is supported on spring suspended wheels and in which the said wheels are adapted to be run into runways in the bottom of the body when the open side of the body is to be closed for baling purposes, and in which the runways are bounded by reinforcements of a rigidity sufficient to withstand crushing under the maximum designed baling pressure of the machine and in which the depth of the said runways is such that during loading the springs of the spring suspension for the wheels may be compressed until loading advances beyond a predetermined amount whereupon the bottom of the truck is caused to rest on said reinforcements and thereby to provide a rigid support which can withstand crushing during the application of continued baling pressure.

Background

In the prior United States patent specification No. 2,757,603 assigned by mesne assignments to Portable Balers Limited of Birmingham, England, there is disclosed a baling machine comprising in combination a hollow body having one open side, a mobile truck separable from said body and mounted for movement independently of and separately from said body, an upright and a base forming part of said mobile truck, said upright being of a size and shape to cover said open side and said base being of a size and shape to fit within the lower portion of said body, said mobile truck being adapted for attachment to said body so that said upright forms a closure for said open side of said body, and said base forms a base within said body upon which material to be baled within the machine may be supported during a pressing operation, means for attachment of said mobile truck to and speedy detachment of said mobile truck from said body whereby a pressed bale may be removed from said body whilst still supported by said mobile truck, and a press head operably associated with said body and movable therein for compressing the material into a bale.

Objective

Baling machines according to our said prior United States Patent No. 2,757,603 are efficient for the baling of loads of the order of say one to two hundredweights, but if an endeavour is made to increase the baling capacity beyond such weights the loading of the mobile truck becomes such that it is difficult to tilt the truck to remove the truck from the body of the baling machine, and hence the present invention has for its objective to provide a baling machine operating on the general principles of the said prior United States patent specification No. 2,757,603 which allows of the construction of a baling machine of far greater baling capacity than is customarily possible with baling machines constructed as described and illustrated in the said United States patent specification No. 2,757,603 and which is not subject to the attendant disadvantages.

Description

An embodiment of the invention will now be described with particular reference to the accompanying drawings in which:

FIGURE 3 is a perspective view of the detachable truck withdrawn from the baling machine and with a tied bale supported therein and with one side of the truck open to facilitate unloading of the bale.

FIGURE 4 is a perspective view of the empty detachable mobile truck.

In the drawings like numerals of reference indicate similar parts in the several views.

Figure 1:
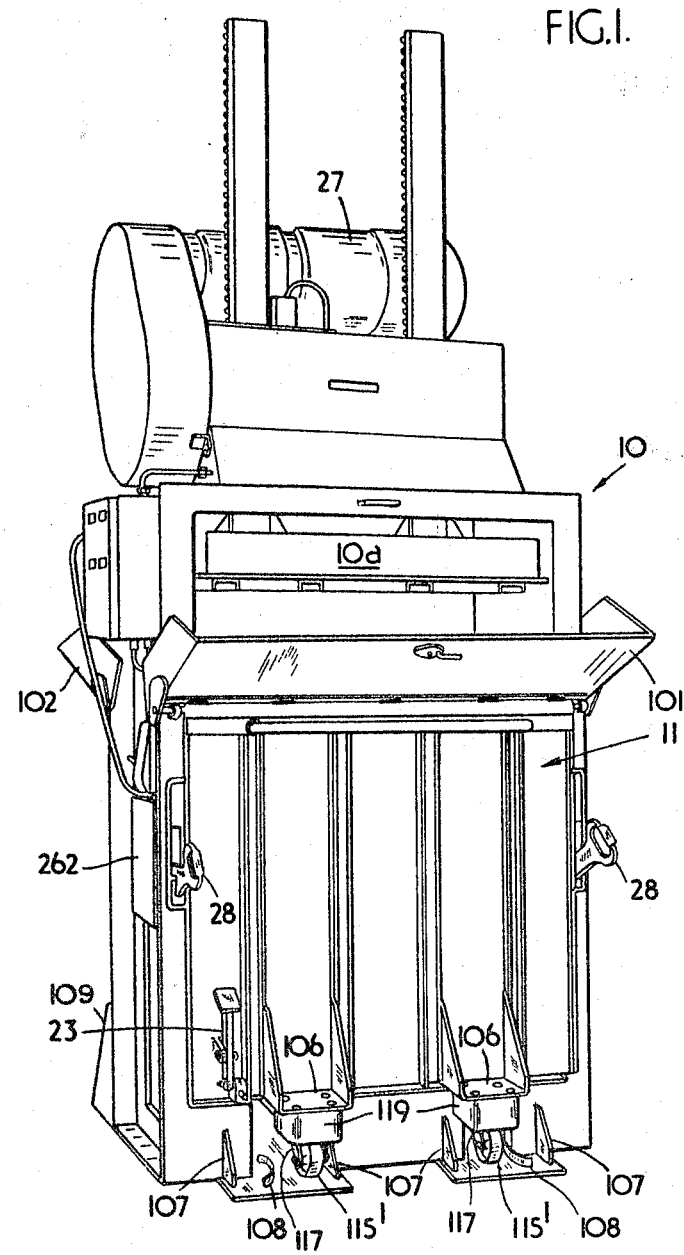
FIGURE 1 is a front perspective view of a baling machine in accordance with the invention with the truck in the closing position for baling.
Figure 2:
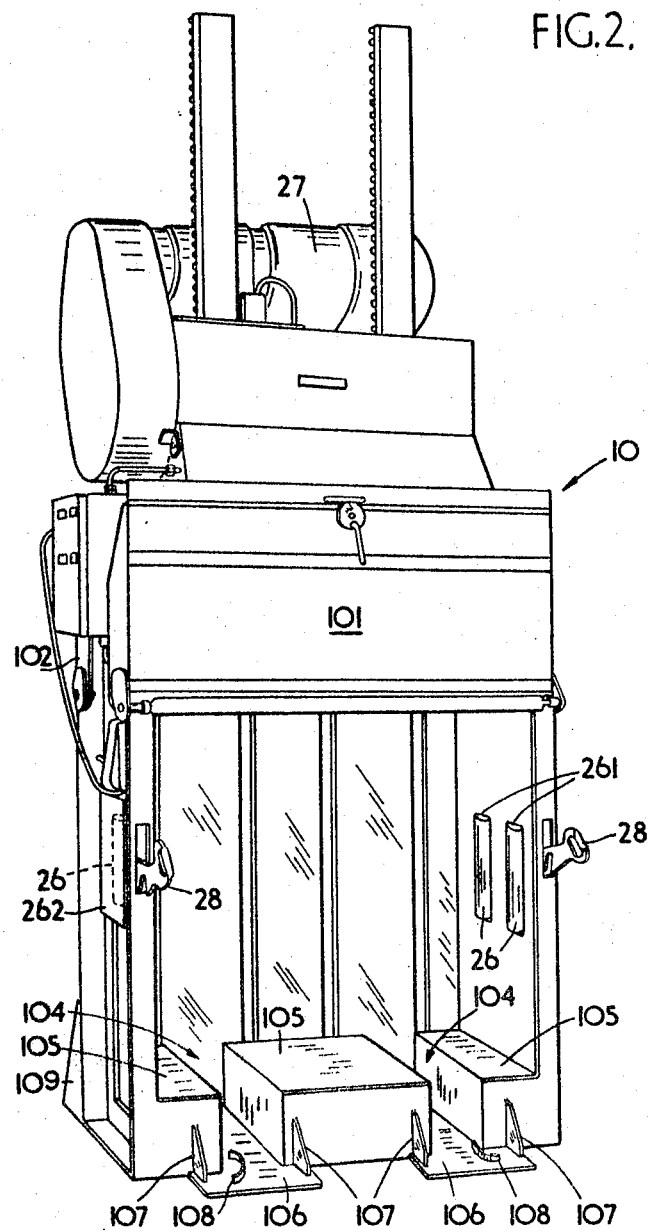
FIGURE 2 is a front perspective view of the baling machine as illustrated in FIGURE 1 with the detachable mobile truck withdrawn.

As illustrated in the drawings, the baling machine incorporates a body designated generically by the reference numeral 10 having an open front (see FIGURE 2) as in the prior United States patent specification No. 2,757,603, into the interior of which is adapted to be wheeled and locked therein a mobile truck designated generically by the reference numeral 11, having an open front, a horizontal bottom 111 and upstanding sides 112 and back 113 which serves to close the open front of the body 10 for baling purposes and to serve as a mobile receptacle into which the waste to be baled may be loaded through hinged chutes 101, and 102 arranged at the front and rear of the body 10 above the maximum height of the bale of waste to be produced.

The bottom of the body 10 is provided with parallel runways 104 which run from front to rear of the body 10 and which are bounded by hollow rectangular box shaped reinforcements 105. The said runways 104 are provided with forwardly directed extensions 106 braced by fillets 107 and provided with upstanding curved lead-in strips 108 for a purpose to be described hereinafter.

The body 10 is also provided with rear triangular extensions 109 for enhancing the stability of the machine as a whole.

The runways 104 are spaced apart so as to receive the wheels 115 of the mobile truck 11 as the truck 11 is wheeled into the open front of the body 10 preparatory to baling.

The front wheels 115 of the truck (see FIGURES 3 and 4) are mounted in saddles 116 which are supported from the bottom 111 of the truck 11 by four coil springs 12 arranged at the corners of a rectangle.

The rear wheels 115' are adapted to caster and are mounted in saddles 117 incorporating a turnable disc 118 which is secured at the centre by a rivet 13 to a bottom plate 14 which is vertically slidable on four posts 15 depending from the extensions 106 with coil springs 17 disposed around the posts 15 and interposed between the bottom plate 14 and the undersides of the extensions 106. Bearing balls 18 are located between each turntable disc 118 and the undersurface of the relevant bottom plate 14 (see FIGURE 4) so that the rear wheels 115' may have a caster action relatively to the forward extensions 106.

Figure 5:
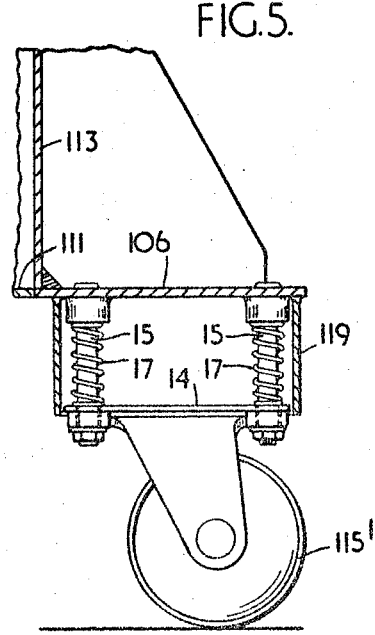
FIGURE 5 is a fragmentary view depicting the manner of mounting of the rear caster wheels of the detachable mobile truck.
Figure 6:
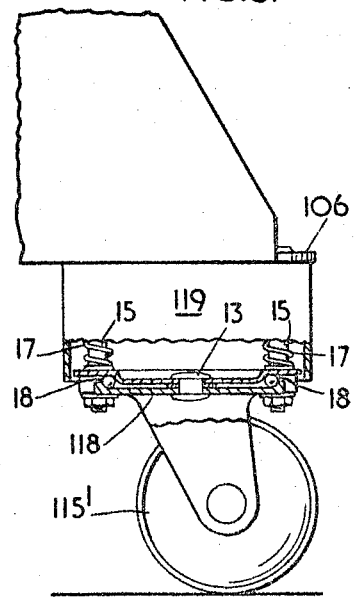
FIGURE 6 is a fragmentary view complementary to FIGURE 4 depicting the manner of mounting the rear caster wheels of the detachable mobile truck and FIGURE 7 is a fragmentary view partly in elevation and partly in section illustrating the manner of locking and releasing the opening side of the detachable mobile truck as illustrated in FIGURE 3.
Figure 7:
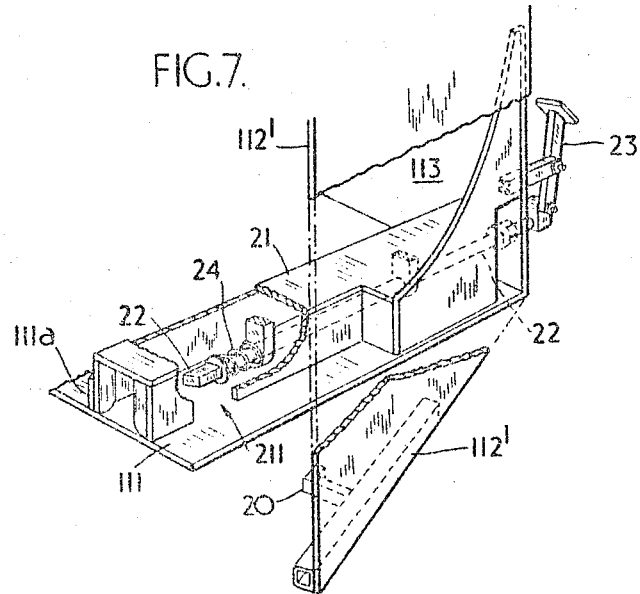

The extensions 106 are preferably fabricated by welding from metal plate in a manner which will be obvious from examination of FIGURES 3, 4 and 5.

The caster wheels 115 are shrouded by sheet metal guards 119.

One side of the truck 11 designated by the reference numeral 112' is hinged to the front of the truck 11 by hinges 19 and this hinged side 112' has fixed to the bottom outer corner thereof a hook catch 20 which is engageable in a slot 211 in a guide box 21 fixed to the bottom 111 of the truck 11, the said hook 20 co-operating with the wedge front end of a locking bar 22 slidably mounted in the said guide box 21. The outer end of the locking bar 22 is connected to the lower end of a block operated by a pedal lever 23 supported from the back 113 of the truck 11 so that by depressing the pedal 23 the wedge end of the locking bar 22 can be drawn out of locking engagement with the hook catch 20 against the resistance of a coil spring 24 to permit of the opening of the hinged side 112' of the truck 11.

The sides of the body 10 are cut away as at 261 and have mounted therein on each side a pair of vertically disposed rollers 26 the peripheries of which project slightly into the interior of the body 10. Externally the rollers 26 are protected by box structures 262 fixed to the sides of the body 10.

The platen of the baling machine 10a is adapted for displacement inside the body 10 and is adapted to be actuated through the medium of rack and pinion gearing which is driven through reduction gearing from an electric motor 27 as in the prior United States patent specification No. 2,757,603. The said platen conveniently is provided with overload safeguarding means as disclosed in our British patent specification No. 1,075,537.

Conveniently the bottom 111 of the truck 11 is provided on the inside with channels 111a running from front to rear which continue in vertical slits 113' in the back 113 of the truck 11 to facilitate the insertion of wire for tying a bale after baling in a manner analogous to that disclosed in our prior United States patent specification No. 2,757,603 aforesaid (see FIGURES 4 and 5).

Drop catches 28 are provided at each side of the body 10 for holding the mobile truck within the body preparatory to and during baling.

In use the material to be baled is fed from the top through the chutes 101, 102 into the body 10 on top of the bottom 111 of the truck 11 when wheeled into the open front of the body 10 and the said material compressed by imparting a downward movement to the platen in the known manner.

Baling proceeds until the load on the springs 12 and 17 of the spring suspension for the wheels 115 of the truck 11 becomes such that the said springs 12 and 17 are compressed to an extent that the bottom 111 of the truck 11 is caused to rest on the tops of the reinforcemens 105 in the bottom of the body 10, thereafter baling can proceed up to the designed loading capacity for a particular machine without risk of crushing and without impairing the mobility of the truck 11.

When the desired loading has been obtained the wires for tying the bale may be inserted through the slits 113' and channels 111a in the bottom 111 of the truck 11 and the bale tied whilst under load in an analogous manner to that described in our aforesaid prior United States specification No. 2,757,603. The baling pressure may then be relieved, the catches 28 released and the truck 11 together with the tied bale removed from the body 10 whereupon the tied bale may be transported on the truck 11 to a desired location.

It will be appreciated that the outboard mounting of the caster wheels 115 at the rear of the truck 11 enhance the stability of the truck 11 as it is being withdrawn from the body 10.

Furthermore, it will be appreciated that moving of the truck 11 for loading purposes is facilitated by the lead-in strips 108 on the extensions 106 of the floor of the body 10.

Further, it will be appreciated that by reason of the oppositely disposed vertically arranged rollers 26 the peripheries of which protrude into the interior of the body of the machine with a clearance contact with the sides of the truck when located within the body for baling, mitigates difficulty of withdrawal of the truck 11 owing to lateral expansion of the sides of the truck 11 arising from baling.

Moreover, it will be appreciated that the opening side 112' facilitates removal of a bale and that the pivotal chutes 101, 102 at front and rear permit of loading from either side of the machine.

Baling machines constructed as hereinbefore described have a greater baling capacity than comparative machines according to our prior United States specification No. 2,757,603, and furthermore provide a detachable mobile truck which is easily manoeuvred and which can be withdrawn from the body of the baling machine after baling with facility.

I claim:

1. A baling machine comprising:
    (a) a hollow body having a back wall, two side walls, and a bottom,
    (b) runways in the bottom of the hollow body,
    (c) a wheeled truck engagable in said hollow body and having a bottom and a front wall,
    (d) releasable means for securing the truck in the hollow body to form an enclosure between said front and back walls,
    (e) a platen mounted on said hollow body and adapted to be driven downwardly into said enclosure to compress material therein,
    (f) wheels on said truck for supporting the truck for mobility over the ground and in said guide ways,
    (g) resilient mountings for said wheels permitting vertical movement of the truck thereon,
    (h) spacer means between the bottom of the hollow body and the bottom of the truck to support the truck with respect to the body independently of said wheels when a pressing force is exerted by said platen to lower the truck on the resilient mountings of the wheels, the resilient mountings lifting the truck to permit mobility thereof on the wheels in the absence of a pressing force from said platen.

2. A baling machine as claimed in claim 1 in which the truck has front and rear wheels and the rear wheels of the truck at least are caster wheels.

3. A baling machine as claimed in claim 1 in which the truck has front and rear wheels and wheels at the rear of the truck are carried by supporting means which project outboard from the rear of the truck.

4. A baling machine as claimed in claim 1 in which the truck has front and rear wheels and the rear wheels are supported by extensions outboard of the rear of the truck and in which the said outboard located wheels are swivelly mounted for caster action and in which guide means is provided for facilitating manoeuvring of the wheels of the truck into the runways in the body of the baling machine.

5. A baling machine as claimed in claim 1 in which the machine has two sides on said truck adapted to fit within the sides of the body and in which the sides of the body are provided with anti-friction members the peripheries whereof protrude into clearance contact with the sides of the truck when in the loading position so that the rolling action permitted by the anti-friction members facilitates the withdrawal of the loaded truck from within the body of the baling machine.

6. A baling machine as claimed in claim 1 in which the machine has two sides on said truck adapted to fit within the sides of the body and in which one at least of the sides of the truck is hingeable so as to be capable of being turned away from the bale when loaded in the truck for facilitating removal of the bale.

7. A baling machine as claimed in claim 1 in which the machine has two sides on said truck adapted to fit within the sides of the body and in which one at least of the sides of the truck is hinged so as to be capable of being hinged outwardly to facilitate removal of a bale and in which pedal operated mechanism is provided for freeing the side for opening purposes as and when required and for locking the side in the closed position during baling.

8. Baling apparatus as claimed in claim 1 in which pivotal chutes are provided at the front and the rear of the body of the baling machine so as to allow of loading from front and rear.

9. A baling machine as claimed in claim 1 in which the truck has front and rear wheels and the rear wheels are spring suspended and swivelly mounted and in which guard means is provided for protecting the springs.

References Cited

UNITED STATES PATENTS

| | | | |
|---|---|---|---|
| 2,757,603 | 8/1956 | Wilson et al. | 100—26 |
| 2,782,710 | 2/1957 | Fishburne | 100—229 XR |

FOREIGN PATENTS

| | | |
|---|---|---|
| 167,966 | 7/1956 | Australia. |
| 420,474 | 11/1910 | France. |
| 761,100 | 1/1934 | France. |
| 879,422 | 10/1961 | Great Britain. |
| 176,000 | 8/1922 | Great Britain. |
| 574,671 | 3/1958 | Italy. |

BILLY J. WILHITE, Primary Examiner

U.S. Cl. X.R.

100—25, 229, 255, 288